United States Patent
Kanchibhotla et al.

(10) Patent No.: US 12,412,044 B2
(45) Date of Patent: Sep. 9, 2025

(54) METHODS FOR REINFORCEMENT DOCUMENT TRANSFORMER FOR MULTIMODAL CONVERSATIONS AND DEVICES THEREOF

(71) Applicant: Openstream Inc., Somerset, NJ (US)

(72) Inventors: Chaitanya Kanchibhotla, Telangana (IN); Pruthvi Raj Venkatesh, Karnataka (IN); Rishu Kumar, Jharkhand (IN); Radha Krishna Pisipati, Telangana (IN); Rajasekhar Tumuluri, Bridgewater, NJ (US)

(73) Assignee: Openstream Inc., Bridgewater, NJ (US)

( * ) Notice: Subject to any disclaimer, the term of this patent is extended or adjusted under 35 U.S.C. 154(b) by 506 days.

(21) Appl. No.: 17/829,731

(22) Filed: Jun. 1, 2022

(65) Prior Publication Data
US 2022/0405484 A1    Dec. 22, 2022

Related U.S. Application Data

(60) Provisional application No. 63/212,743, filed on Jun. 21, 2021.

(51) Int. Cl.
| | | |
|---|---|---|
| *G06F 40/40* | (2020.01) | |
| *G06F 40/205* | (2020.01) | |
| *G06F 40/35* | (2020.01) | |
| *G06N 5/04* | (2023.01) | |

(52) U.S. Cl.
CPC ............ *G06F 40/35* (2020.01); *G06F 40/205* (2020.01); *G06F 40/40* (2020.01); *G06N 5/04* (2013.01)

(58) Field of Classification Search
None
See application file for complete search history.

(56) References Cited

U.S. PATENT DOCUMENTS

| | | | |
|---|---|---|---|
| 11,128,579 B2 | 9/2021 | Magliozzi et al. | |
| 2016/0085853 A1* | 3/2016 | Zelevinsky | G06F 16/338 707/765 |
| 2016/0188747 A1* | 6/2016 | Cypher | G06F 16/84 707/756 |
| 2018/0329884 A1 | 11/2018 | Xiong et al. | |
| 2020/0019642 A1 | 1/2020 | Dua et al. | |
| 2021/0342399 A1* | 11/2021 | Sisto | G06F 16/90332 |

* cited by examiner

*Primary Examiner* — Nafiz E Hoque
(74) *Attorney, Agent, or Firm* — Young Basile Hanlon & MacFarlane, P.C.

(57) ABSTRACT

A computer-implemented method and system for enrichment of responses in a multimodal conversation environment are disclosed. A Question Answer (QA) engine, such as a reinforcement document transformer exploits a document template structure or layout, adapts the information extraction using a domain ontology, stores the enriched contents in a hierarchical form, and learns context and query patterns based on the intent and utterances of one or more queries. The region of enriched content for preparing a response to a given query is expanded or collapsed by navigating upwards or downwards in the hierarchy. The QA engine returns the most relevant answer with the proper context for one or more questions. The responses are provided to the user in one or more modalities.

20 Claims, 18 Drawing Sheets

```
Query: what is abstract in usenix example paper?
Embedding: [[ 0.5586913  -0.2402073  -0.87256265 ... -0.51859856 -0.10632968
  -0.12468677]
 [ 0.82279927 -0.25591287 -1.0463973  ... -0.6611461  -0.19973126
  -0.2904423 ]]
```

B. General Conditions
1. Bankruptcy
Bankruptcy or insolvency of the "insured" or the "insured's" estate will not relieve us of any obligations under this Coverage Form.
2. Concealment, Misrepresentation, Or Fraud
This Coverage Form is void in any case of fraud by you at any time as it relates to this Coverage Form. It is also void if you or any other "insured", at any time, intentionally conceals or misrepresents a material fact concerning:
    a. This Coverage Form;
    b. The covered "auto";
    c. Your interest in the covered "auto"; or
    d. A claim under this Coverage Form.

```
<div class="txt" style="position:absolute; left:54px; top:356px;"><span id="f3" style="font-size:10px;vertical-align:baseline;color:rgba(0,0,0,1);">B. General Conditions</span></div>
<div class="txt" style="position:absolute; left:69px; top:371px;"><span id="f3" style="font-size:10px;vertical-align:baseline;color:rgba(0,0,0,1);">1. Bankruptcy</span></div>
<div class="txt" style="position:absolute; left:84px; top:386px;"><span id="f2" style="font-size:10px;vertical-align:baseline;color:rgba(0,0,0,1);">Bankruptcy or insolvency of the "insured" or the</span></div>
<div class="txt" style="position:absolute; left:84px; top:397px;"><span id="f2" style="font-size:10px;vertical-align:baseline;color:rgba(0,0,0,1);">"insured's" estate will not relieve us of any</span></div>
<div class="txt" style="position:absolute; left:84px; top:408px;"><span id="f2" style="font-size:10px;vertical-align:baseline;color:rgba(0,0,0,1);">obligations under this Coverage Form.</span></div>
<div class="txt" style="position:absolute; left:69px; top:423px;"><span id="f3" style="font-size:10px;vertical-align:baseline;color:rgba(0,0,0,1);">2. Concealment, Misrepresentation Or Fraud</span></div>
<div class="txt" style="position:absolute; left:84px; top:438px;"><span id="f2" style="font-size:10px;vertical-align:baseline;color:rgba(0,0,0,1);">This Coverage Form is void in any case of</span></div>
<div class="txt" style="position:absolute; left:84px; top:449px;"><span id="f2" style="font-size:10px;vertical-align:baseline;color:rgba(0,0,0,1);">fraud by you at any time as it relates to this</span></div>
<div class="txt" style="position:absolute; left:84px; top:460px;"><span id="f2" style="font-size:10px;vertical-align:baseline;color:rgba(0,0,0,1);">Coverage Form. It is also void if you or any</span></div>
<div class="txt" style="position:absolute; left:84px; top:471px;"><span id="f2" style="font-size:10px;vertical-align:baseline;color:rgba(0,0,0,1);">other "insured", at any time, intentionally</span></div>
<div class="txt" style="position:absolute; left:84px; top:482px;"><span id="f2" style="font-size:10px;vertical-align:baseline;color:rgba(0,0,0,1);">conceals or misrepresents a material fact</span></div>
<div class="txt" style="position:absolute; left:84px; top:493px;"><span id="f2" style="font-size:10px;vertical-align:baseline;color:rgba(0,0,0,1);">concerning:</span></div>
<div class="txt" style="position:absolute; left:84px; top:508px;"><span id="f3" style="font-size:10px;vertical-align:baseline;color:rgba(0,0,0,1);">a. </span><span id="f2" style="font-size:10px;vertical-align:baseline;color:rgba(0,0,0,1);">This Coverage Form;</span></div>
<div class="txt" style="position:absolute; left:84px; top:523px;"><span id="f3" style="font-size:10px;vertical-align:baseline;color:rgba(0,0,0,1);">b. </span><span id="f2" style="font-size:10px;vertical-align:baseline;color:rgba(0,0,0,1);">The covered "auto";</span></div>
<div class="txt" style="position:absolute; left:84px; top:538px;"><span id="f3" style="font-size:10px;vertical-align:baseline;color:rgba(0,0,0,1);">c. </span><span id="f2" style="font-size:10px;vertical-align:baseline;color:rgba(0,0,0,1);">Your interest in the covered "auto"; or</span></div>
<div class="txt" style="position:absolute; left:84px; top:553px;"><span id="f3" style="font-size:10px;vertical-align:baseline;color:rgba(0,0,0,1);">d. </span><span id="f2" style="font-size:10px;vertical-align:baseline;color:rgba(0,0,0,1);">A claim under this Coverage Form.</span></div>
```

FIG. 5C

```
"714": [
  "80",
  "1. Bankruptcy",
  10,
  "bold",
  34
},
"715": [
  "84",
  "Bankruptcy or insolvency of the (\"insured\") or the (\"insured's\") estate will not relieve us of any obligations under this Coverage form.",
  10,
  "normal",
  34
},
"716": [
  "69",
  "2. Concealment, Misrepresentation or fraud",
  10,
  "bold",
  34
},
```

A. General Conditions
 1. Bankruptcy
  Bankruptcy or insolvency of the "insured" or the "insured's" estate will not relieve us of any obligations under this Coverage Form.
 2. Concealment, Misrepresentation Or Fraud
  This Coverage Form is void in any case of fraud by you at any time as it relates to this Coverage Form. It is also void if you or any other "insured", at any time, intentionally conceals or misrepresents a material fact concerning:
   a. This Coverage Form;
   b. The covered "auto";
   c. Your interest in the covered "auto"; or
   d. A claim under this Coverage Form.

This is Bankruptcy General Conditions in A [BUSINESS AUTO COVERAGE FORM] [BUSINESS AUTO COVERAGE FORM] [General Conditions] [Bankruptcy] Bankruptcy or insolvency of the "insured" or the "insured's" estate will not relieve us of any obligations under this Coverage Form. {34
This is Concealment, misrepresentation or Fraud General Conditions in A [BUSINESS AUTO COVERAGE FORM] [BUSINESS AUTO CONDITIONS] [General Conditions] [Concealment, misrepresentation or Fraud] This Coverage Form is void in any case of fraud by you at any time as it relates to this Coverage Form. It is also void if you or any other "insured" at any time intentionally conceals or misrepresents a material fact concerning: {34
This is Concealment, misrepresentation or Fraud General Conditions in A [BUSINESS AUTO COVERAGE FORM] [BUSINESS AUTO CONDITIONS] [General Conditions] [Concealment, misrepresentation or Fraud] This Coverage Form. {34
This is Concealment, misrepresentation or Fraud General Conditions in A [BUSINESS AUTO COVERAGE FORM] [BUSINESS AUTO CONDITIONS] [General Conditions] [Concealment, misrepresentation or Fraud] The covered "auto"; {34
This is Concealment, misrepresentation or Fraud General Conditions in A [BUSINESS AUTO COVERAGE FORM] [BUSINESS AUTO CONDITIONS] [General Conditions] [Concealment, misrepresentation or Fraud] Your interest in the covered "auto"; or {34
This is Concealment, misrepresentation or Fraud General Conditions in A [BUSINESS AUTO COVERAGE FORM] [BUSINESS AUTO CONDITIONS] [General Conditions] [Concealment, misrepresentation or Fraud] A claim under this Coverage Form. {34

FIG. 5H c=this is bankruptcy general conditions in ^ [business auto coverage form] [business auto conditions] [general conditions] [bankruptcy] bankruptcy or insolvency of the insured or the insured's estate will not relieve us of any obligations under this ns] [general conditions] [concealment, misrepresentation or fraud] a claim under this coverage form.; 0.0000297295

FIG. 5I

'Bankruptcy\n Bankruptcy or insolvency of the "insured" or the "insured's" estate will not relieve us of any obligations under this coverage form.'

FIG. 5J

METHODS FOR REINFORCEMENT DOCUMENT TRANSFORMER FOR MULTIMODAL CONVERSATIONS AND DEVICES THEREOF

CROSS-REFERENCE TO RELATED APPLICATION(S)

This application claims priority to and the benefit of U.S. Provisional Application Patent Ser. No. 63/212,743, filed Jun. 21, 2021, the entire disclosure of which is hereby incorporated by reference.

TECHNICAL FIELD

This disclosure relates to human-computer interactions, and more particularly a system and method for providing enriched responses in a multimodal conversation environment on a document corpus, identifying the query patterns, and responding to the queries in one or more modalities.

SUMMARY

Disclosed herein are implementations of reinforcement document transformers for multimodal conversations. In an aspect, a method may include receiving a multimodal query input via one or more sensors of a computing device. The multimodal query may be associated with a conversation. The method may include parsing the multimodal query to obtain parsed content. The method may include extracting one or more multimodal entities from the parsed content. The method may include translating one or more multimodal representations associated with the one or more multimodal entities. The method may include generating joint representations of the one or more multimodal entities. The method may include identifying at least one semantic relationship between the one or more multimodal entities. The method may include determining a query intent and context of the conversation. The method may include outputting one or more responses to the multimodal query.

In an aspect, a method may include receiving a document repository of an organizational domain. The document repository may include documents. The method may include identifying a document type of each document in the document repository. The method may include extracting a domain-specific n-gram for each document. The method may include comparing each document with key terms of training data. The method may include assigning weights to the domain-specific n-grams. The method may include assigning each document to a document class. The method may include parsing a document structure and content of each document. The method may include extracting meta content from each document using a domain ontology. The method may include identifying structure characteristics to obtain a tree structure that represents contents of respective documents in a hierarchical structure. The method may include padding the contents in one or more parent positions of the tree structure to obtain a flattened tree structure. The method may include outputting the flattened tree structure.

In an aspect, a system may include a memory and a processor. The processor may include a reinforcement document transformer. The processor may be configured to create one or more corpus embeddings for one or more sentences in a corpus. The processor may be configured to store the one or more corpus embeddings in the memory. The processor may be configured to perform a semantic comparison of query embeddings and the one or more corpus embeddings. The processor may be configured to determine a closest corpus embedding by identifying relevant documents from the corpus for one or more query inputs. The processor may be configured to retrieve a response based on the closest corpus embedding using a transformer model.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 4E and 4F show an example of a query and its corresponding embedding generated by the RDT in the vector space.

FIG. 5B is an illustration of a portion of an sample document.

FIG. 5C is an example of an equivalent portion of text from the hypertext markup language (HTML) file that is generated from the portion of the sample document shown in FIG. 5B.

FIG. 5D is an illustration of an example of the equivalent Meta javascript object notation (JSON) file for a portion of the selected paragraphs.

FIG. 5E is an illustration of an example of the equivalent tree structure for the selected paragraphs.

FIG. 5F is an illustration of an example of the flattened tree structure for the selected paragraphs.

FIG. 5G is an illustration of an example of the equivalent embeddings in vector space for the selected paragraphs using the sentence transformers.

FIG. 5H is an illustration of an example of the equivalent query embeddings in vector space using the sentence transformers and the similarity score for the statements.

FIG. 5I is an illustration of an example of the output of the cross encoding.

FIG. 5J is an illustration of an example of the output of a relevant paragraph retrieval from the tree structure.

DETAILED DESCRIPTION

With the increase in large-scale data storage and ease of using the internet, massive data is stored in various data sources such as on-premise or cloud environments, and is made available to the public. Searching and exploring such a vast volume of data makes information retrieval a timeconsuming and difficult process. This problem has prompted the development of modern, more adaptable research methods, such as Question Answering Systems (QA system). In reality, QA systems allow the user to ask questions in natural language (NL) and return the correct answer to the questions rather than a collection of documents deemed appropriate. The three important components in any QA system are Question Analysis, Document Retrieval, and Answer Extraction.

In recent years, QA systems have gained popularity in domains such as insurance, healthcare, and other domains. Organizations pertaining to these domains possess a large document corpus where each document ranges from a few pages to a few thousand pages. QA systems need to identify the appropriate region of content that can identify and extract relevant responses for one or more queries. Building a question answering system in these domains is challenging for various reasons including (a) documents are varied formats such as a portable document format (PDF), images, or other formats, and comprise structured, semi-structured, and unstructured content, (b) documents are from multiple classes, (c) documents are prepared with a plurality of templates (structure/layout) where each template comprises key-value pairs, tables and free form text, (d) documents may have titles and subtitles, sections and sub-sections with section and sub-section headings, paragraphs and subparagraphs, domain-specific key terms and key phrases, and the like. Further, correlating text present in multiple paragraphs is needed while presenting the answer to the user, and identifying the relevant answer is more challenging if the region of the response for the query contains both paragraph (sub-)heading and some of the paragraph text content. Moreover, the relevant context can be present in multiple text spans (also referred to as extents) in the document.

Figure 1:
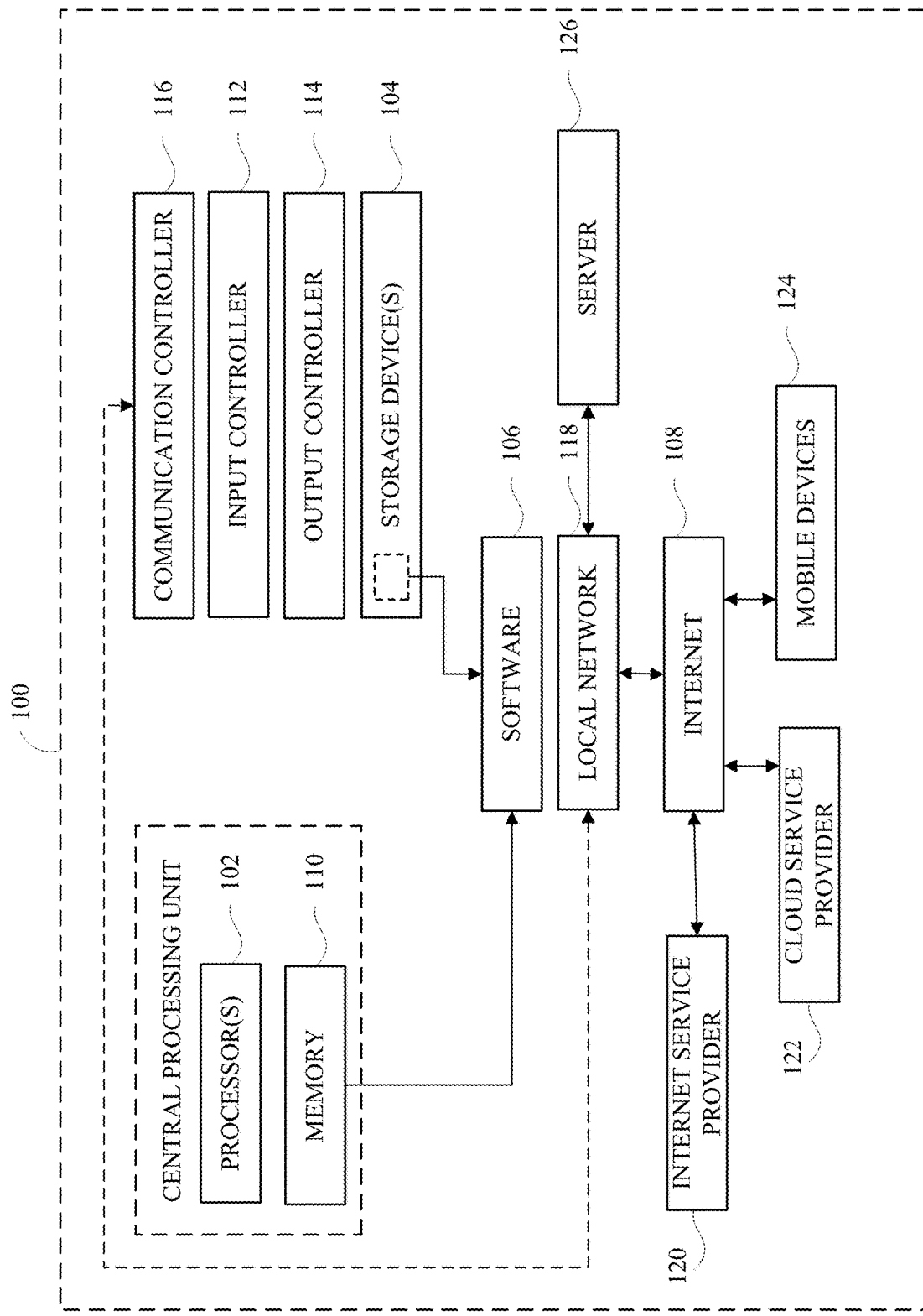
FIG. 1 is a block diagram of an example of a system in accordance with embodiments of this disclosure.

FIG. 1 is a block diagram of a computing device 100 to which the present disclosure may be applied according to an embodiment of the present disclosure. The system includes at least one processor 102, designed to process instructions, for example, computer-readable instructions (i.e., code) stored on a storage device 104. By processing instructions, processing device 102 may perform the steps and functions disclosed herein. Storage device 104 may be any type of storage device, for example, but not limited to an optical storage device, a magnetic storage device, a solid-state storage device, and a non-transitory storage device. The storage device 104 may contain software 106 which is a set of instructions (i.e. code). Alternatively, instructions may be stored in one or more remote storage devices, for example, storage devices accessed over a network or the internet 108. The computing device also includes an operating system and microinstruction code. The various processes and functions described herein may either be part of the microinstruction code or part of the program (or combination thereof) which is executed via the operating system. Computing device 100 additionally may have memory 108, an input controller 112, and an output controller 114, and the communication controller 116. A bus (not shown) may operatively a couple of components of computing device 100, including processor 102, memory 110, storage device 104, input controller 112, output controller 114, and any other devices (e.g., network controllers, sound controllers, etc.). Output controller 114 may be operatively coupled (e.g., via a wired or wireless connection) to a display device (e.g., a monitor, television, mobile device screen, touch-display, etc.) in such a fashion that output controller 114 can transform the display on a display device (e.g., in response to modules executed). The input controller 112 may be operatively coupled (e.g., via a wired or wireless connection) to the input device (e.g., mouse, keyboard, touchpad, scanner, Scroll-ball, touch-display, etc.) in such a fashion that input can be received from a user. The communication controller 116 is coupled to a bus (not shown) and provides a two-way coupling through a network link to the internet 108 that is connected to a local network 118 and operated by an internet service provider (hereinafter referred to as ISP) 120 which provides data communication services to the internet. The network link typically provides data communication through one or more networks to other data devices. For example, the network link may provide a connection through local network 116 to a host computer, to data equipment operated by an ISP 120. A cloud service provider 122 and mobile devices 124 provides data storage and transfer services to other devices through the internet 108. A server 126 may transmit a requested code for an application through internet 108, ISP 120, local network 118, and communication controller 116. Of course, FIG. 1 illustrates computing device 100 with all components as separate devices for ease of identification only. Each of the components may be separate devices (e.g., a personal computer connected by wires to a monitor and mouse), may be integrated into a single device (e.g., a mobile device with a touch-display, Such as a Smartphone or a tablet), or any combination of devices (e.g., a computing device operatively coupled to a touch-screen display device, a plurality of computing devices attached to a single display device and input device, etc.). Computing device 100 may be one or more servers, for example, a farm of networked servers, a clustered server environment, or a cloud network of computing devices.

An embodiment describes a method of multimodality attention discovery for effective Question and Answer via a conversational virtual assistant tool. A user provides a set of inputs. These inputs may be provided by the user through a multimodal interface-based computer-implemented tool. These inputs are, but not limited to, images, speech, audio, text, facial expressions, body language, touch, scanned object, and video.

Figure 2:
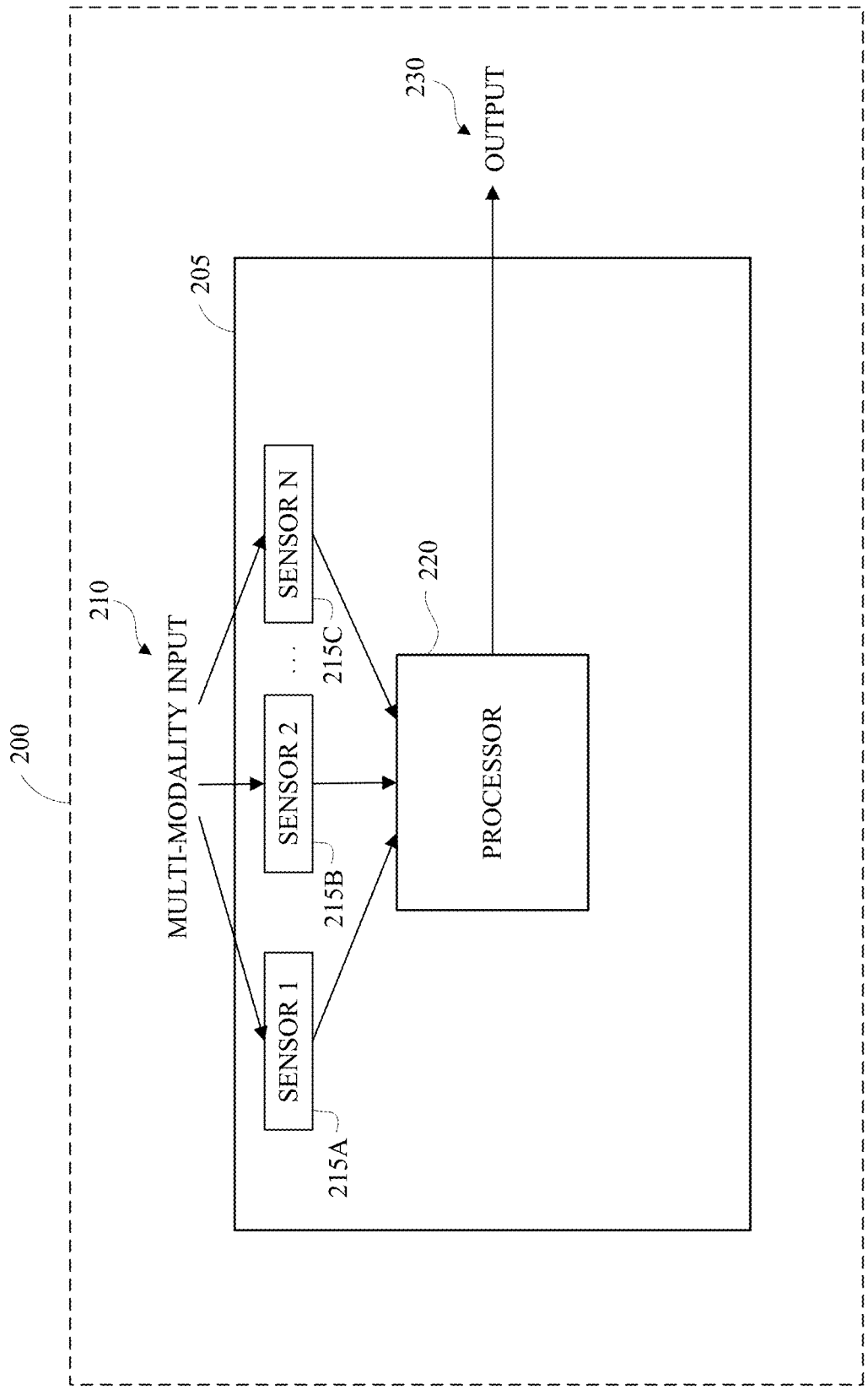
FIG. 2 is a block diagram of an example of a system framework for implementing the embodiments disclosed herein.

FIG. 2 is a block diagram of an example of a system 200 in accordance with embodiments of this disclosure. In this example, a computing device 205 may include a processor 220. The processor 220 may be a multi-modal processing component. In some embodiments, the processor 220 may be implemented with a soft-agent. The soft-agent may be a software component that is configured to allow users to provide inputs via a multi-modality interface. Computing device 205 may be configured to receive a multi-modality input 210, for example via a multi-modal interface. The multi-modality input 210 may be obtained by one or more sensors 215A-215C. Any number of sensors may be implemented, and three sensors are shown in FIG. 2 for simplicity and clarity. The one or more sensors 215A-215C may be any type of sensor including, for example, an interactive touch display, a microphone, a global positioning system (GPS) sensor; an accelerometer, or a biometric sensor. In an example, sensor 215A may be a microphone, sensor 215B may be an interactive touch display, and sensor 215C may be an accelerometer.

The multi-modality input 210 may comprise free-form text input in the form of a question or a statement. Alternatively, or in addition to, the multi-modality input 210 may comprises audio input such as speech or voice input, some other form of multi-modality input such as an image, video, touch, scanned object, gesture, or any combination thereof. In an example, the computing device 205 may be configured to processes the multi-modality input 210 using the processor 220 by a soft-agent to produces an output 230. Output 230 may include, for example, a search query that can be sent to a web data store stored on one or more other computing devices (not shown) for processing. Alternatively, processing of search queries may be performed by the processor 220 of the computing device 205. As another example, the output 230 may include a display of ordered search results obtained in response to a search query. The output 230 may include a multi-modality output that includes a display for an interactive dashboard, a text-to-speech audio output, an audible or haptic alert or notification, or any combination thereof.

When a user is registered with the system 200, the application and data stores that are allowed by the user are configured for accessing and retrieving information from those applications and data stores. The system 200 may be configured to provide different user-access permission depending the user role and entitlements. Access to specific application and specific data stores is given to a user based on the user roles. When a new user is registered, the administrator may configure the access permission as per the user role, which enables the user to access the applications and data stores that are allowed for that specific role. Once the administrator approves the permissions, the user may access and retrieve the information from the allowed applications and data sources. One or more roles may be assigned to a user.

Figure 3:
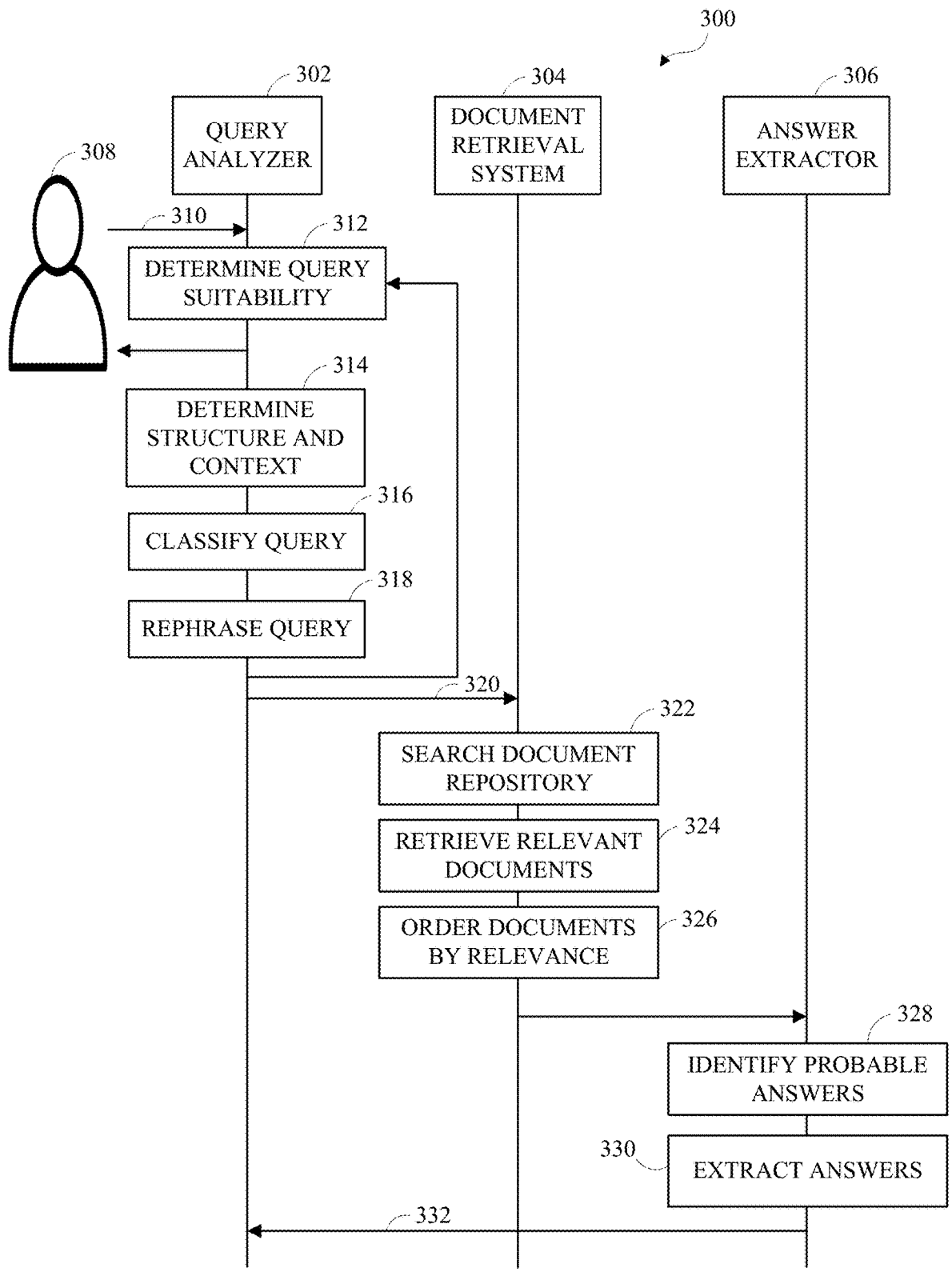
FIG. 3 is a block diagram of an example of a typical question and answer system.

FIG. 3 is a block diagram of an example of a typical QA system 300. The QA system 300 includes a query analyzer 302, a document retrieval system 304, and an answer extractor 306. In this example, a user 308 posts a question 310 (i.e., query) to the QA system 300. The query analyzer 302 determines 312 the suitability of the query to the QA system 300. If the question 310 is appropriate to the QA system 300, the query analyzer 302 determines 314 the structure and context of the query using a combination of natural language processing (NLP) techniques such as n-gram analysis, parts-of-speech tagging, noun-phrase extraction, or any combination thereof. The context of the query may be a combination of intra-query context and inter-query context. For example, for a given query, the query analyzer 302 may identify the keywords and key phrases in the query that provide the intent of the query. These intent-specific keywords and key phrases, along with their associated neighborhoods (i.e., words before and after these keywords and key phrases) form the intra-query context. The inter-query context may be determined based on the coherence and intent among the sequence of previous queries in the conversation. The query analyzer 302 is configured to classify 316 the query. Classifying the query may include identifying the question type, for example, using a classifier. In some examples, the question may be rephrased 318 to best fit with the QA system 300.

The query analyzer 302 is configured to transmit the processed question 320 to the document retrieval system 304. The document retrieval system 304 is configured to search 322 a document repository and retrieve 324 the relevant documents from the document repository using techniques like TF-IDF similarity, Jaccard index, Word embeddings, Deep Learning text similarity algorithms, and the like. The relevant documents may be retrieved based on the determined structure of the query, the determined context of the query, the classification of the query, or any combination thereof. The relevant documents are assumed to contain a relevant response. The relevant documents are ordered 326 based on the system score that may be calculated based on the semantic similarity between the documents present in the knowledge base and the user query, and are sent to the answer extractor 306. Distance measures, such as cosine similarity, Euclidian distance, Manhattan distance, Jaccard similarity, and Minkowski distance may be used to determine semantic similarity. The answer extractor 306 is configured to identify 328 the probable answers using a collection of methodologies such as re-ranking using n-grams, custom rules and inferences that are framed using a knowledge base, and rearranging the answers based on a span of features. Finally, the relevant answer is extracted 330 from the probable answers. The relevant answer 332 may be validated for correctness and transmitted to the user. In general, all the questions can be classified into the following categories.

The first category may include questions that expect only one among the two answers, i.e., either "Yes" or "No." They are usually treated as General or most common questions. These are usually used in QA systems when there is a predefined workflow in scenarios like decision support systems.

The second category may include questions that start with terms such as: who, what, where, when, why, how, and how many. These kinds of questions usually expect one-word answers like counts, names of objects, the meaning of the words, and the like. These were used in traditional QA systems in which the answers are marked as having human involvement.

The third category may include questions that have multiple options in the question themselves. These are usually multiple-choice questions. The QA systems built on these kinds of questions have limited capability, such as generating a conclusive answer based on inputs.

The fourth category may include factoid questions in which the answer is contained inside a text. The response to these kinds of questions can be a single word or multiple words or sentences. The answer to this kind of question is present in text block having one or more sentences. Some examples for this type of question are "Who is the current president of the United States?," "List all the participating nations in the cricket world cup," and "List all the conditions in this agreement." To answer these types of questions manually, users need to spend some time on the relevant paragraphs to find the relevant answer. QA systems that deal with natural language utterances should be able to support these questions.

Typically, the data in the real world is present in multiple formats such as structured data, unstructured data, or semi-structured data. Structured data may be the type of data that is present in in tables, database systems, such as relational database management systems (RDBMS), knowledge graphs, semantic web, and the like. Semi-structured data may be the type of data that is present in lists or extensible markup language (XML) files having a limited relationship between entities, semi-structured web documents, and so on. Unstructured data may be the type of data in which the data is present as plain text such as policy documents, frequently asked questions, articles on the web, documentation for the users in product manuals, customer use cases, or customer reviews, formed using natural language rules. Moreover, for unstructured data, the structure of data has a significant impact on the system's accuracy.

Usually, indentation is maintained while preparing the documents using a plurality of templates to visually recognize the sections or subsections.

A knowledge base is a variety of databases for knowledge management. It contains information about the large number of triples formed with the subject, object, and relation. These triples are also known as facts. These knowledge sources are useful due to their improved accuracy over other knowledge sources.

Open-domain QA systems are configured to process questions about any topics or questions belonging to a large number of domains. QA systems belonging to this category are difficult to build as the system is expected to form generic queries and should be easily scalable to handle any new additional domain. These systems deal with large data sources such as Wikipedia, data from web pages, and other large data sources. In these systems, the user is expected to ask any type of question. These systems depend on general ontologies and real-world knowledge. DrQA, which is developed by the Facebook research team is one such system that is trained on Wikipedia articles.

A Closed-domain QA system is configured to process questions for a specific domain (for example medical, education, insurance, etc.). These systems depend on domain-specific ontologies. In this type of system, the users are expected to ask limited types of questions. In terms of stability, this category of systems tends to be more stable than the open domain systems. Natural Language Processing (NLP), Natural Language Understanding (NLU) systems are used in this category. QA systems such as Alexa and Google home are some of the day-to-day examples belonging to this category.

Question answering (QA) is one of the widely researched areas in NLP. QA is widely used in applications such as chatbots and dialogue systems to aid human conversations. Some of the state-of-the-art QA systems—for example, IBM Watson uses standard NLP techniques such as dependency parsing, parts of speech tagging, coreference resolution, and the like. With the advancements of deep learning in recent times, models like neural networks showed promising results. These kinds of models require a huge amount of training data as they have a linearly increasing learning curve. One such example, belonging to this area is the Recurrent neural networks (RNNs) which can handle QA longer texts by using gated recurrent unit (GRU) and long short term memory (LSTM) units. Other notable deep learning models for building QA systems are the Sequence-to-sequence models. Deep learning models are used for QA systems as they can automatically learn complex representations from the question. They can also support automatic learning and knowledge exchange at the intermediate levels. Deep learning models have already shown their performance in open-domain QA systems for NLP activities such as reading comprehension, neural network information retrieval for achieving state-of-the-art performance. On the other hand, transformer models have completely dominated and achieved state-of-the-art models in NLP. They contain a series of transformer blocks arranged in layers. The state-of-the-art transformer-based pre-trained language models include bidirectional encoder representations from transformer (BERT), generative pre-trained transformer (GPT) model, robustly optimized BERT (RoBERTa), an extension of an extra-long transformer (XLNet) model that is pre-trained using an autoregressive method, efficiently learning an encoder that classifies token replacements accurately (ELECTRA), and text-to-text transfer transformer (T5). These models are used in downstream NLP tasks by fine-tuning on a specific dataset.

Typical QA systems may suffer from a variety of drawbacks. A first drawback may be that techniques such as term frequency—inverse document frequency (TF-IDF) similarity, Jaccard index, Word embeddings, Deep Learning text similarity algorithms that are used for relevant document retrieval, have their advantages and disadvantages in terms of memory, time taken for execution, identifying a correct strategy for finding similarity index, and the like. Moreover, their suitability for large data is still challenging.

A second drawback may be that most of the current QA engines perform only the relevant "document retrieval" functionality that closely matches the query. They do not return the exact answers and some post-processing is needed to identify the correct answer. Hence, there is a need to tune the QA system to retrieve the appropriate answers to user queries rather than returning a complete passage or best matching passages from documents, as most QA systems typically do.

A third drawback may be that it is challenging and essential for a QA system to handle or satisfy the queries related to all the knowledge sources and return a natural language response to a user query.

A fourth drawback may be that open-domain QA systems are very difficult to build as they depend on generic ontologies and real-world knowledge. The training time for these types of systems is very high due to the amount of data that is required to train the system. Moreover, the systems are expected to be easily scalable to handle any new additional domain.

A fifth drawback may be that in closed domain systems such as healthcare or insurance, most of the data is present in electronic formats such as portable document format (PDF) having both structured (mainly in the form of tables) and unstructured content (mainly in the form of text blocks). Following are some of the challenges for these types of documents. Data in these documents can be voluminous. If the answer to the user query spans across multiple passages and pages in the document, correlating relevant answer text spans from multiple places is challenging, mainly while presenting the answer to the user. The text/paragraph in the documents can have a heading, side heading, etc. describing the context of the text. It may be challenging for a QA system to handle a question that relates both paragraph heading and some of the paragraph text content. Identifying the most suitable answer for the question is challenging as the relevant context can be present in multiple text spans in the document. Identifying the most relevant text span for retrieving the most suitable answer relating to a question can be challenging as the relevant context can be present in multiple text spans in the document.

This disclosure proposes a Reinforcement Document Transformer (RDT) based on a multimodal conversation system that exploits the document template structure (or layout), adapts the information extraction using a domain ontology, store the enriched contents in a hierarchical form, learn the context and query patterns and returns the most relevant answer (a single or multiple text span or a short answer) for one or more multimodal queries.

In the disclosed embodiments, an RDT is configured to generate automatic responses in a conversation that comprises one or more multimodality content. The RDT determines semantic relationships among the multimodal entities, and generates query and context patterns. This disclosure uses natural language processing, computer vision, speech processing, and machine learning techniques to analyze the multimodal query and prepare an appropriate response to the user query.

While the embodiments are susceptible to various modifications and alternative forms, specific embodiments thereof are shown by way of example in the drawings and will be described in detail below. It should be understood, however that it is not intended to limit the disclosure to the particular forms disclosed, but on the contrary, the disclosure is to cover all modifications, equivalents, and alternatives falling within the spirit and the scope of the disclosure as defined by the appended claims.

The input modalities in a conversation include facial expressions, speech patterns, and text obtained via one or more sensors. The issue with the analysis of one or many modes of a query (Visual, Verbal, or Vocal) is that some semantical and contextual information among the modes can be misled. This necessitates an understanding of the cross-modal dependencies and temporal context of the conversation to analyze the query.

Figure 4A:
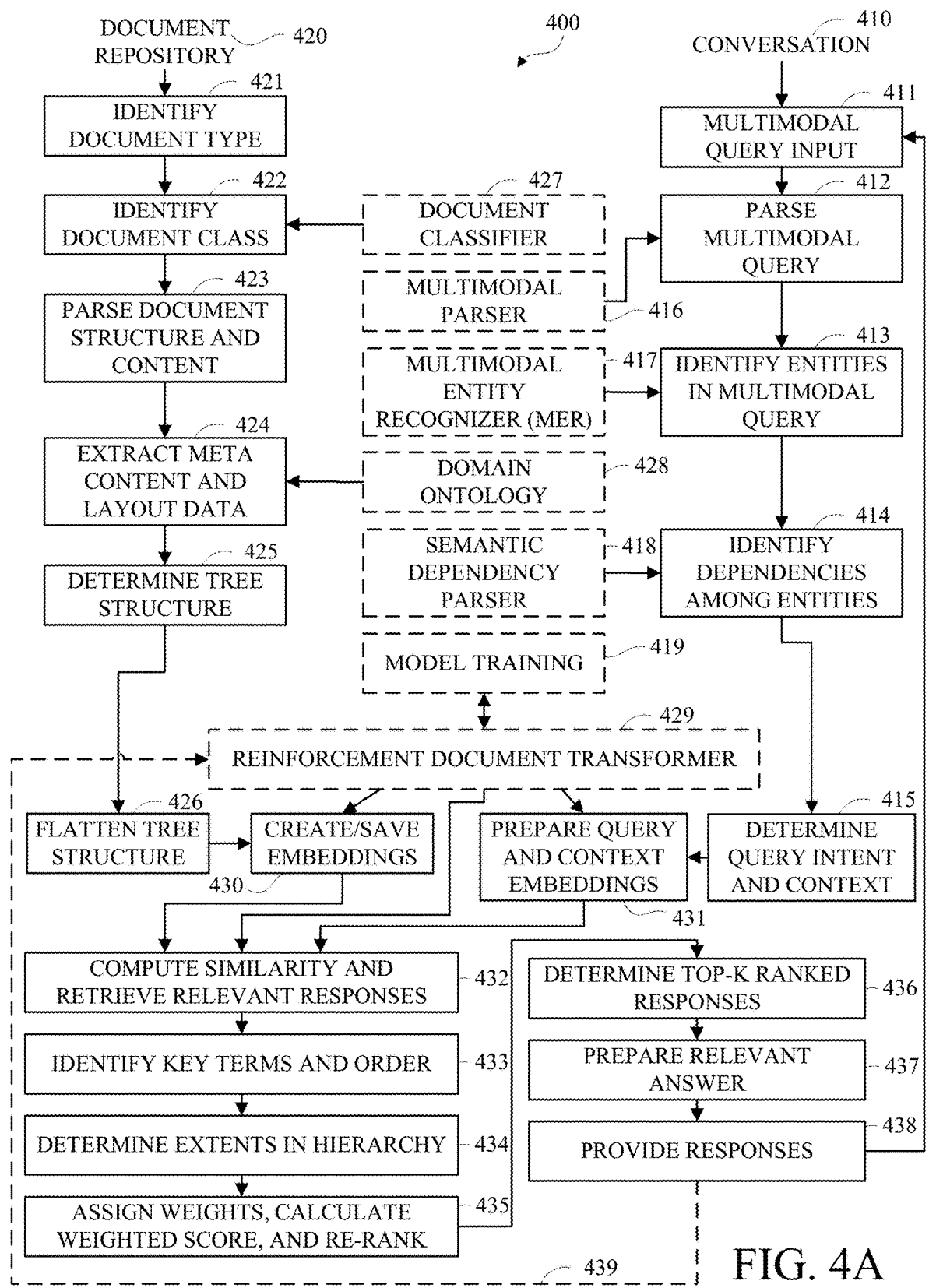
FIG. 4A is a flow diagram of an example of a multimodal conversation system using a Reinforcement Document Transformer (RDT) in accordance with embodiments disclosed herein.

FIG. 4A is a flow diagram of a multimodal conversation system 400 using an RDT 429 for capturing one or more multimodal queries by users and providing responses according to an example embodiment. The entire approach can be divided into two phases: (a) Ingesting documents from a document repository 420 specific to an organization and creating a knowledge repository by flattening a document tree structure 426 and creating and/or saving embeddings 430, and (b) accepting a multimodal conversation 410 and providing responses 438. Documents may be read sequentially from the documents repository 420 and analyzed for their content and structure. The document repository 420 can be present either on-premises (such as local drive, shared drives, file shares) or in a cloud repository belonging to any available cloud computing platforms such as Azure, Amazon Web Services (AWS), and Google Cloud Platform (GCP). Documents can be read using the modules leveraging the native drivers (e.g., APIs such as download blob method for Azure cloud, getObject method for AWS, and download_to_filename method for GCP).

The type of document (such as pdf, word, HTML, etc.) is identified 421 for all the documents in the document repository. The document type plays a key role in identifying and extracting the document meta content since some document formats such as PDF, Word, etc. support the document meta content extraction. Document meta content is useful for identifying the structure in the document.

Figure 4B:
FIG. 4B is an example of a format for term weights.

The exemplary multimodal conversation system identifies the document class 422 using a document classifier 427. The document classes may be domain-specific, for instance, for the insurance domain, the document classes may be Auto, Global casualty, Gadget insurance, or any similar document class associated with insurance. Similarly, for a banking domain, the classes are Mortgage, Housing and Urban Development (HUD), Truth-in-Lending (TIL), or any similar document class associated with banking. In an embodiment, a domain-specific document classifier may be developed. The domain-specific document classifier may use domain-oriented terms that play a pivotal role in classifying the documents. One of the ways of identifying the domain-specific terms may be by using the n-grams model. The training document set may include sample documents for each class. Initially, n-grams (uni-grams, bi-grams, tri-grams) are extracted from each training document. The n-grams may be divided into two groups, namely with-in-domain and out-of-domain. The with-in-domain group may contain all the domain n-grams, and the out-of-domain group may contain the rest of the extracted n-grams. To identify the with-in-domain group, domain-specific terms provided by the domain expert or subject matter expert (SME) are considered and n-grams are extracted for the same. Term matching with extracted n-grams is performed and the matched terms are considered as with-in-domain and the rest of the extracted n-grams are considered as out-of-domain terms. For the document classification, only with-in-domain terms are considered. This is because (a) out-of-domain n-grams may bias the result, (b) the overall solution space is decreased for the next subsequent runs which can bring down the memory requirement, overall execution time, and (c) for handling the terms that are more specific to a certain class, term weights are assigned to each class. The term weights are more for the classes to which they belong, otherwise, it is treated as 1. FIG. 4B is an example of a format 440 for term weights.

As shown in FIG. 4B, $term_1$ has more weight for class 2 when compared to other classes. Similarly, $term_2$ has more weight for class 3. The total class weight is calculated for all classes by adding the term weight for all the with-in-domain n-grams. The total class weight is calculated using the below formula.

$$CW_{C1} = \forall_{within\text{-}domain\ terms}(\Sigma_{j=0}^{P} Weight_P)$$

Here 'P' is the count of with-in-domain n-grams. $CW_{C1}$ is the class weight for class C1, $Weight_P$ is the term weight that is assigned to the class. The class weight vector for a document is represented as, $$[CW_1, CW_2, CW_3, CW_4, \ldots CW_n]$$

Here, $CW_1$ is the class weight for class 1, $CW_2$ is the class weight for class 2 and similarly, $CW_n$ is the class weight for class n. These class weights are considered while classifying a test document, and the test document is assigned to a class that has the highest score.

Referring back to FIG. 4A, the document is parsed to determine the document structure and content 423. The document is parsed for extracting meta content such as font size, font-weight, text color, text indentation (left margin, top margin), The possible values for text characteristics are f1—which stands for bold, f2—which stands for italics, f3—which stands for regular text (which is without any of the properties such as bold, underlined, italicized, etc.). The content is extracted from the documents using libraries such as Xpdf. Xpdf is an open-source utility that works mainly for PDF documents for operations such as converting them into plain text, HTML, or generate postscript files. The HTML conversion feature is used to generate HTML and PNG files for every page in the PDF document. The HTML file consists of attributes such as font, font-weight, x and y coordinates of the text, color of the text, text indentation (left margin), etc. A PNG file may include the structures present on the page, such as tables, horizontal lines (i.e., section separators), page borders, and any other structure associated with the page.

In this example, the meta content and layout structure data is extracted 424 based on the identified document class and the domain ontology 428. A domain ontology 428 holds details about the structure of the data and the details about each structured field extracted from the source document. An ontology file is a JSON file that is created after reviewing the information present within the source document. A domain expert may create the ontology file. The ontology file aims to facilitate three important activities in the structured data load of the Question answering system: (i) automatic extraction of data from source documents, (ii) automatic loading of extracted data into the persistent store, and (iii) creation of dynamic query scripts for querying the datastore during the question and answering session. A typical ontology file may include one or more types of information such as key-value pairs, table data information, and entity-relationship information. The ontology file is also used for creating the data extraction configuration file that holds the mapping between the key-value pair attributes, table attributes, and the information required to locate this data in the file.

The meta content is stored in a meta JSON file. For example, a custom python script is used to create a JSON file from the HTML file. The JSON file consists of only selected metadata properties such as text, font size, font-weight, indentation, page number, or the like. In the case of a PDF document having two columns, the indentation value for text present in the second column may be determined by subtracting half of the page width value from the indentation value determined by XPDF. The meta content may be used to determine 425 the tree structure of the document. In this example, a tree structure may be created from a Meta JSON file by customizing the pytree.py python library. Text indentation plays a pivotal role in determining the parent-child relations in the tree. Parent-child relation in the tree is based on the two properties: (a) text with less indentation value from the meta JSON file becomes the root for the following immediate text having more indentation value, and (b) text with a bold font (section headings usually) is more likely to be a parent in the tree for one or more paragraphs (children) having the same indentation level.

Before forming the tree structure, all the unstructured text is initially extracted, and parent-child relations are formed using the rules described below. A text block can be considered as a heading if it satisfies any of the below conditions.

The embodiments disclosed herein may take font characteristics into account. For example, the paragraph headings in some documents may be in bold font. This is can be identified using the text characteristic value. The textual block is considered as bold if its value is f1, that is, bold in the meta JSON content.

The embodiments disclosed herein may take text characteristics into account. Example text characteristics can include whether the text block starts with an alphabet followed with '.', whether the length of the text block is less than the length of its immediate text, whether the font size of the text block is greater than the font size of its immediate text block, or any combination thereof. In an example, the system may identify the text blocks as headings, such as "A. Abstract", "B. Introduction", "C. Results", and so on.

The embodiments disclosed herein may take text length into account. The system may determine that the length of the text is less than the length of its immediate text block. Consider the sample text below:
Introduction
  For the purposes of USENIX conference publications, the authors, not the USENIX staff, are solely responsible for the content and formatting of their paper. The purpose of this template is to help those authors that want to use HTML/CSS to write their papers.

The system may identify the text block "Introduction" as a heading to its immediate text as its length is less than the length of its immediate text. After identifying the text blocks as headings, parent-child relations are determined. Indentation of the text may be used to form the parent-child relations.

The embodiments disclosed herein may take text indentation into account. Text indentation (which is the left-margin value of a tag in the meta JSON file) is one of the parameters used to identify the parent-child relationships. The parent-child relationships are identified based on the following conditions. If the difference between left margin values of the text block and its immediate text block is less than K points (where K is an integer and is greater than 0), the text block may be considered as a parent to its immediate text block, if the left margin value of the text is less than the following immediate text block. If the difference between left margin values of the text block and its immediate text block is more than K points, the text block may be considered as a parent to its immediate text if the left margin value of the text block is closer to half of the page width value, otherwise, the left margin value of its immediate text block is less than the left margin value of text block. This applies to the cases where the heading is in the middle oriented in single-column format.

Figure 4C:
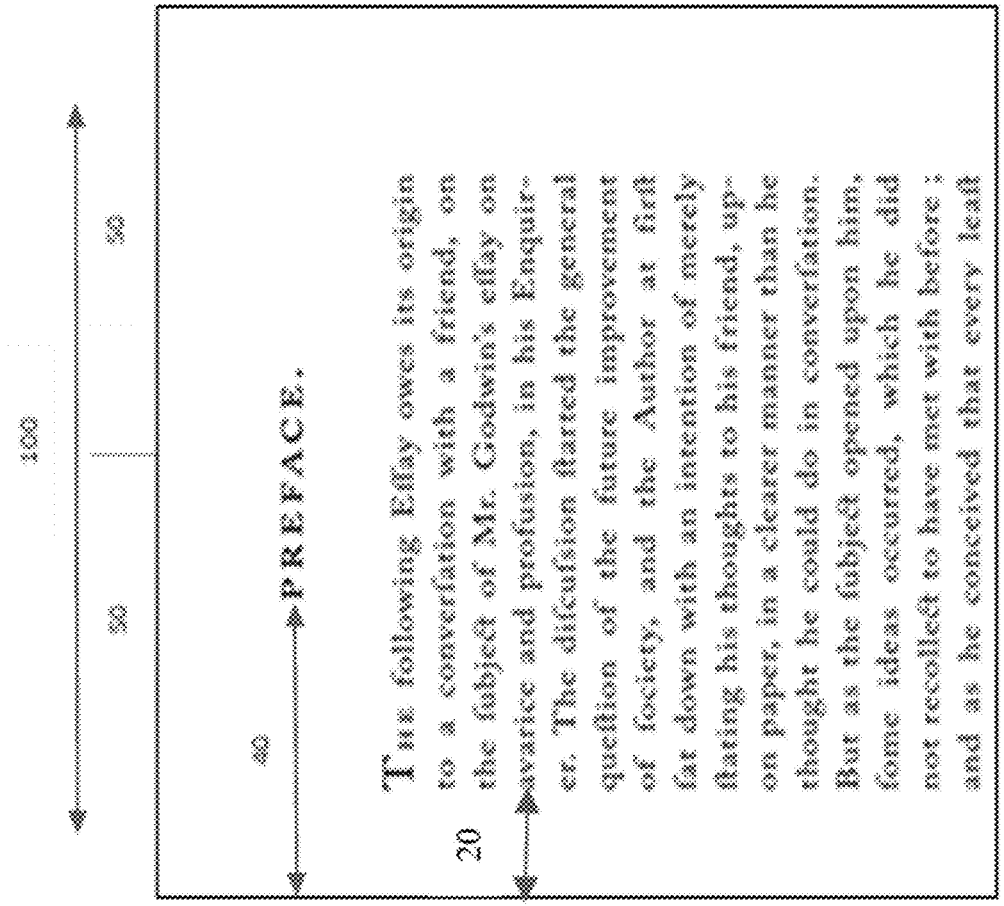
FIG. 4C is a diagram of an example of a parent-child relation in a page of a document.

FIG. 4C is a diagram of an example of a parent-child relation in a page 445 of a document. As shown in FIG. 4C, considering that the page 445 has a page width of 100 pixels, half of the page width value is 50 pixels. The left margin of the text block "PREFACE" is 40 pixels. The left margin of its immediate text block (starting with "The following . . . ") is 20 pixels. As the left margin value of the text block "PREFACE" (40 pixels) is closer to the half of page width value (50 pixels) and its immediate text margin value (20 pixels) is less than the left margin value of the text block "PREFACE", the text block "PREFACE" is considered as the parent of its immediate text block.

If the difference between left margin values of the text block and its immediate text block is more than K points, the text block is considered as a parent to its immediate text if (a) the left margin value of the text block is closer to one-fourth of the page width value, and (b) left margin value of its immediate text block is less than the left margin value of text block. This applies to the cases where the heading is in the middle oriented in two-column format.

Figure 4D:
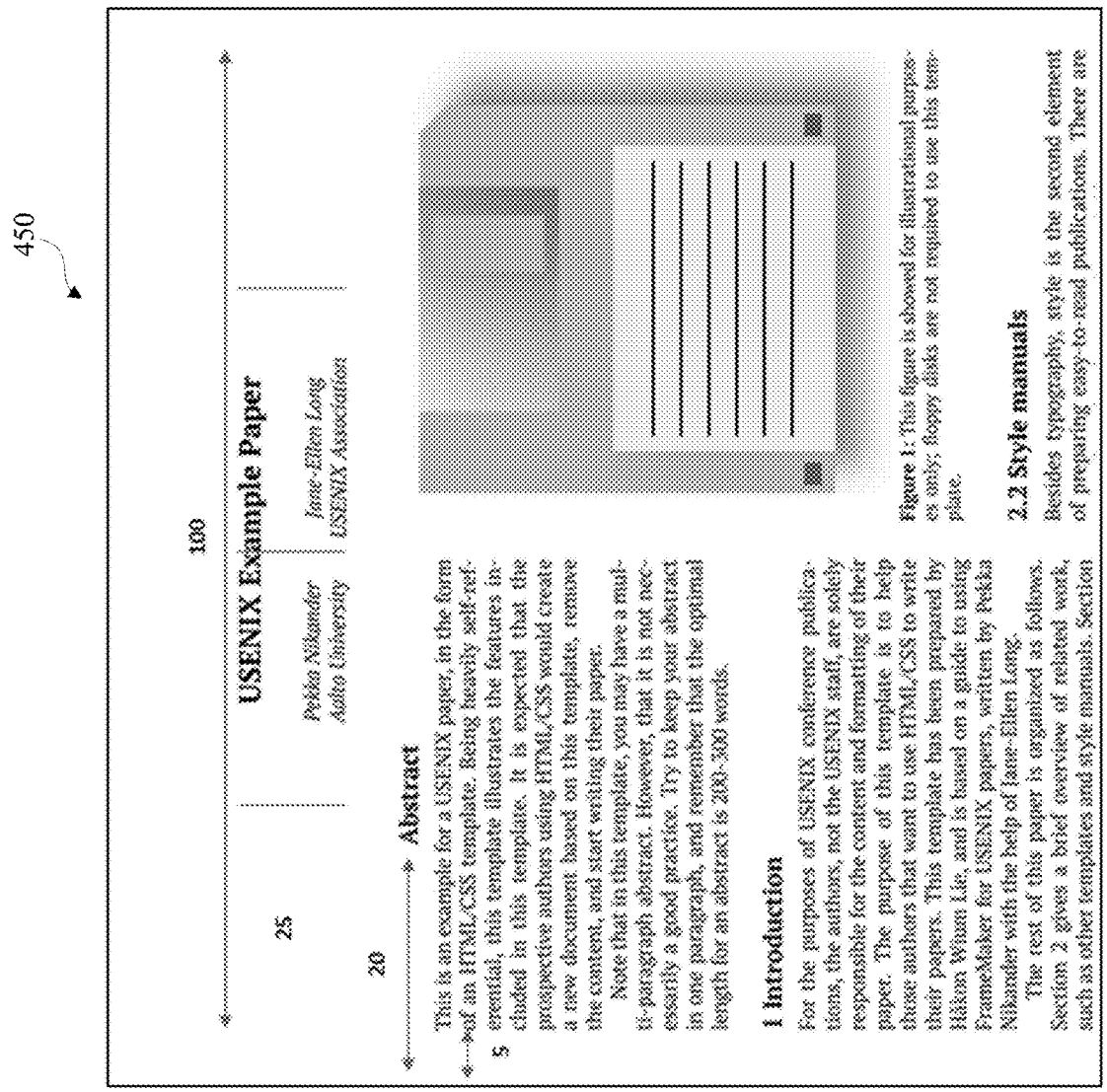
FIG. 4D is a diagram of another example of a parent-child relation in a page of a document.

FIG. 4D is a diagram of another example of a parent-child relation in a page 450 of a document. In this example, the page 450 has a two-column format. As shown in FIG. 4D, considering the page 450 has a page width of 100 pixels, one-fourth of the page width value is 25 pixels. The left margin of the text block "Abstract" has a value of 20 pixels. The left margin of its immediate text block (starting with "This is an example . . . ") has a value of 5 pixels. As the left margin value of "Abstract" (20 pixels) is closer to the one-fourth of page width value (25 pixels) and its immediate text margin value (5 pixels) is less than the left margin value of the text block "Abstract", the text block "Abstract" is considered as the parent of its immediate text block.

The position of the actual text determines the highest level of the tree. For a tree with 'n' levels, level 'n' corresponds to the paragraph text in the document, level 'n−1' corresponds to its immediate heading, level 'n−2' corresponds to the immediate heading of 'n−1', and so on. Similarly, level 1 corresponds to the main heading of the document. Below is the sample tree structure:

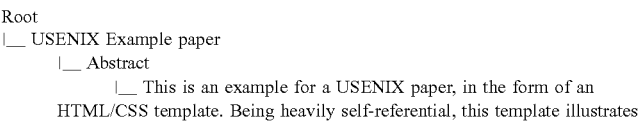

the features included in this template. It is expected that the prospective authors using HTML/CSS would create a new document based on this template, remove the content, and start writing their paper
| Note that in this template, you may have a multi-paragraph

---

Here the "root" is the default term in the tree and all the text blocks are considered as their children by default. The root is considered as level 0. The term "USENIX Example paper" is the child of the root. This is considered a level 1 child. The term "Abstract" is level 2 text and the text block under it (which is "This is an example .") is formed as the child as the left margin value of the text block "abstract" is more than its immediate text block. This is considered as level 3 text. The paragraph text is considered the last level text.

Referring to FIG. 4A, the tree structure is flattened by padding with the additional content 426. The generated flat files are stored in a .txt format. These flat files comprise custom formatted sentences, which are formed by leveraging the tree-level information. Suppose a paragraph in the PDF document has 'n' levels in the tree structure, in which level 'n' corresponds to the paragraph text, level 'n−1' corresponds to immediate heading, level 'n−2' corresponds to the immediate heading of 'n−1' and so on. The following is an example of creating the flattened text from the tree.

<<"#level_1-text . . . # level_'n−2'_text # level_'n−1'_text # level_'n'_text>>

A separate entry exists for each paragraph in the flat file if a section contains multiple paragraphs. The same procedure is followed recursively for all the text present in the document. Additional information in the following format is prepended for every sentence present in the flattened file with a custom text such as "This is" and "in".

<<"This is # level 'n−1'_text # level 'n−2' text>>

The whole concatenated text is shown below (Here, ^ denotes the beginning of flat tree text).

<<"This is # level 'n−1'_text # level 'n−2' text>>^<<"#level 1 text # level 'n−2' text # level_'n−1'_text # level_'n'_text>>

Flat files are generated using the 'k' levels information, where 'k' (k<=n) is the total number of levels considered for a flat-file generation. The general format of the flat file generation is as below:

<<Custom words>><<level_text$_1$>><<level_text$_2$>> . . .
  <<Last_level_text>>

In an example, custom words may be the user-provided words that can be a single word or a combination of multiple words.

level_text$_1$, level_text$_2$, are the level texts from the tree. Last_level_text is the actual paragraph text.

The order of level information in sentences present in flat files plays a crucial role in improving the efficiency of QA system response. Hence, flat files are generated in both ascending and descending order of 'k' level information. For example, if k=2, the custom formatted sentences in the flat file are as presented below.
  i. <<"This is # level 'n−1'_text # level 'n−2'_text . . . Last_level_text>>—This sentence is generated in descending order of level information in tree.
  ii. <<"This is # level 'n−2'_text # level 'n−1' text . . . Last_level_text>>—This sentence is generated in ascending order of level information in the tree.

Table 1 shows some of the statements from the flat file that may be generated from the sample tree structure. The statements are generated for the abstract section of the document. The abstract has two paragraphs. The first paragraph is starting with "This is an example . . . " and the second paragraph is starting with "Note that in this template . . . ". The statements are ordered using two-levels, i.e. k=2. The two levels that are considered are level 1 and level 2 text blocks from the tree.

TABLE 1

| Statement No. | Statements in flat file |
|---|---|
| 1 | This is Abstract USENIX Example Paper This is an example for a USENIX paper, in the form of an HTML/CSS template. Being heavily self-referential, this template illustrates the features included in this template. It is expected that the prospective authors using HTML/CSS would create a new document based on this template, remove the content, and start writing their paper |
| 2 | This is Abstract USENIX Example Paper Note that in this template, you may have a multi-paragraph abstract. However, that it is not necessarily a good practice. Try to keep your abstract in one paragraph, and remember that the optimal length for an abstract is 200-300 words. |
| 3 | This is USENIX Example Paper Abstract This is an example for a USENIX paper, in the form of an HTML/CSS template. Being heavily self-referential, this template illustrates the features included in this template. It is expected that the prospective authors using HTML/CSS would create a new document based on this template, remove the content, and start writing their paper. |
| 4 | This is USENIX Example Paper Abstract Note that in this template, you may have a multi-paragraph abstract. However, that it is not necessarily a good practice. Try to keep your abstract in one paragraph, and remember that the optimal length for an abstract is 200-300 words. |

In all the example statements shown in Table 1, the starting two words, i.e. "This is" are the custom words. The words "Abstract" and "USENIX Example Paper" are level 1 and level 2 texts. Statement 1 and Statement 2 are related to first paragraph statements and second paragraph statements having the tree text in ascending order. Statement 3 and Statement 4 are related to the first paragraph having the tree text in descending order for both the statements.

Embeddings in the vector space are created and saved 430 using Sentence Transformers for all the sentences in the flattened files (referred to as corpus embeddings). A RDT 429 is configured to pre-train the model such as "msmarco-distilbert-base-v2" to create the embeddings. The model is trained 419 on the MicroSoft Machine Reading Comprehension (MSMARCO) Passage Ranking dataset with 500k actual queries from Bing search. After creating the embeddings, the embeddings are stored in the elastic search database, a non-structured query language (NoSQL) database. Elastic search is a search engine based on the Lucene library, which provides storage and search functionalities for large datasets.

Queries in a Multimodal conversation 410 are submitted through a multimodal user interface. The multimodal query input 411 can be a combination of one or more multi modes such as text, speech, image, gesture, touch, map, etc. The input query is parsed 412 using a multimodal parser 416. Multimodal Entity Recognizer (MER) 417 module identifies one or more entities in the multimodal query 413. MER in this embodiment is configured using Natural Language Processing, Computer Vision, and Speech technologies. MER is also used to tag the words (using POS tagger) and objects (using object recognition). In this example, a POS tagger may be software that facilitates reading a text in some language and labelling each word in that texts with its appropriate part-of-speech based on its definition and context. Parts-of-speech include nouns, verbs, adverbs, adjectives, pronouns, conjunctions, and the like. MER translates the multimodal representations using modality translation and produces joint representations of multimodal content such as images and text.

The Semantic Dependency Parser 418 module identifies the dependencies among entities 414 (e.g., multimodal entities) that have a semantical relationship. The Semantic Dependency Parser 418 may identify at least one semantic relationship between the entities 414. The system determines the query intent and context 415 based on the conversation. Query and context embeddings 431 for the specified query are prepared using the RDT 429. The Semantic Dependency Parser 418 may output dependency information that represents at least one relationship.

The query and context embeddings 431 and corpus embeddings 430 are compared based on their semantic equivalence. The semantic similarity is calculated between the corpus embeddings and query embeddings, for example, using cosine similarity 432 to determine a semantic score. The key terms in the given query are identified, and this semantic score can be used to find the closest corpus embeddings for a given query and context embedding based on the key terms and tree structure, and retrieve the top-k sentences as responses 433. Here 'k' is the number of returned answers based on decreasing order of the semantic score. The region(s) of the text in the tree, called Extent(s), is determined based on the key terms matching in the hierarchy (such as heading, sub-heading, sub-sub-heading, etc.). Each Extent 434 is growing or shrinking according to the key terms, sequence of the queries, and context at the point in the conversation. The score for each occurrence of each term is weighted and a weighted score 435 is calculated for each sentence in the flattened tree structure corresponding to the determined Extents. Re-ranking may be performed using the pre-trained model such as "ms-marco-electra-base," a cross encoder model having better re-ranking efficiency. As the data can be present in multiple paragraphs, all the sequential paragraphs should be returned as an answer to the user. The top-k re-ranked responses are determined at step 436. The top answer from the flat tree structure is retrieved (by splitting with '^') and relevant answers are prepared with the proper context for a given query 437. The flat tree structure that is extracted is used to search the tree to determine: (a) the tree node in which the paragraph (level 'n') text is present, (b) the paragraph heading node for node returned in (a), and (c) all the children of the node returned in (b). Finally, the responses are provided to the user 438 through a multimodal user interface. The conversation is continued with the next multimodal query input 411. The query patterns are identified from the sequence of queries in a conversation and based on the responses provided and feedback from users, the RDT 429 is updated according to the document contents and query patterns 439.

The RDT 429 is based on sentence transformers. Sentence transformer is a framework for generating the embeddings for textual data. Textual data can be both word and sentence embeddings. Sentence transformers are based on transformer models such as BERT, RoBERTa, DistilBERT, and the like. DistilBERT is a small, fast, and light transformer model that is trained by distilling a BERT base. They also offer GPU support to fasten the process. Sentence embeddings are created for all the sentences that are present in flat files referred to as corpus embeddings.

Figure 4F:
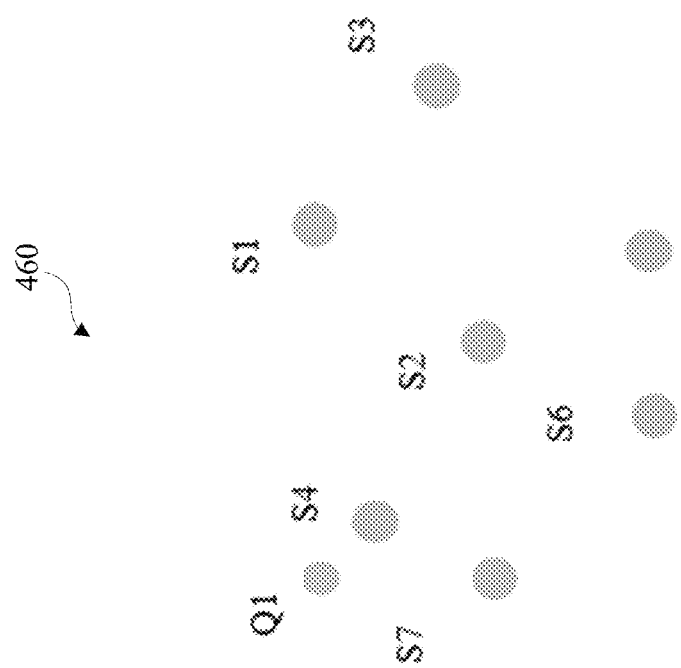

FIGS. 4E and 4F show an example of a query 455 and its corresponding embedding 460 generated by the RDT in the vector space. The RDT 429 is trained with sample utterances along with the intents of the sentences. The sample utterances can be provided in file types such as CSV/excel/txt file. The sample utterances are treated as the document collection store for all the activities such as document retrieval, handling semantics, identifying the intent, for example. The RDT 429 is also capable of processing the semantics of a sentence. The sentence embeddings are compared with the embeddings of all the documents present in the document store. The embeddings are compared in a vector space using similarity measures, such as cosine-similarity, to find sentences with similar meanings. The RDT 429 can also identify query intent based on the training data that is provided. A machine learning model is trained with the training data that includes sample utterances and their associated intents. During the runtime execution, the model performs semantic analysis using the trained utterances with reference to the user query. The intent of the most semantically equivalent utterance may be considered as the intent of the user query. Semantic comparison is performed between the documents in the document store and the most relevant document is returned based on the similarity score. Traditional search engines are capable of returning the documents based on lexical matches where are the transformer-based semantic search is capable of improving the search accuracy by finding and understanding the contents of the query. The basic idea behind doing the sematic comparison is to embed all the documents present in the corpus (which can be sentences, words, or documents) and query into the same vector space. The corpus embeddings which are close to the query embeddings are considered as semantically similar to each other. As shown in FIG. 4F, the query embedding Q1 is close to embedding for sentence S4. Hence, they can be considered as similar to each other.

Any distance/similarity measuring metric such as cosine similarity Euclidean Distance, Manhattan Distance, Jaccard Similarity, or Minkowski Distance can be used. Sentence transformers return a set of the most pertinent documents. These documents are usually ordered by the pertinency score which is between 0 and 1. If the pertinency value is closer to 0, then it means that the document is less pertinent to the query, and a value closer to 1 indicates that the document is pertinent to the query. The query set returned may have both pertinent responses and non-pertinent responses. It is challenging to filter out non-pertinent responses and find only the pertinent responses. Relevant responses can be identified in the below ways.

One potential way of identifying the pertinent responses is to identify the key terms and assign weights to the key terms. The total weight score is calculated for sentences and the sentence with a higher score is identified as the most appropriate response. The sentence transformer is extended in RDT 429 by adding an extra layer on top of the results layer. One potential way to identify the key terms may be by leveraging the tree information. The text at level n is taken from the tree and is assigned a unique weight W. If a query has 'n' key terms, the n unique weights are represented by $[W_1, W_2, W_3 \ldots W_n]$. The total weight of a sentence (i.e., sentence score) is calculated by the below formula:

$$WScore(S_i) = \sum_{i=0}^{n} W_n$$

where WScore is the weighted score of statement $S_i$, n is the number of key terms, and $W_n$ is the weight related to key terms. The sentence score becomes critical when multiple sentences have common terms.

The order of terms in the query and order of terms in sentences in a flat-file is used in retrieving the relevant documents. The score is increased if the order of terms in both query and sentence are the same. The RDT 429 identifies the rules based on the top results that are retrieved by the system. The learning can be in the order of key terms. These rules are stored and reused in subsequent executions. The benefits of reusing already identified rules include: (a) retrieve the most relevant documents from the corpus (document repository), (b) filter out non-relevant documents, and (c) decrease solution space, where the solution space is a set of all feasible solutions that can be used in future operations.

Figure 5A:
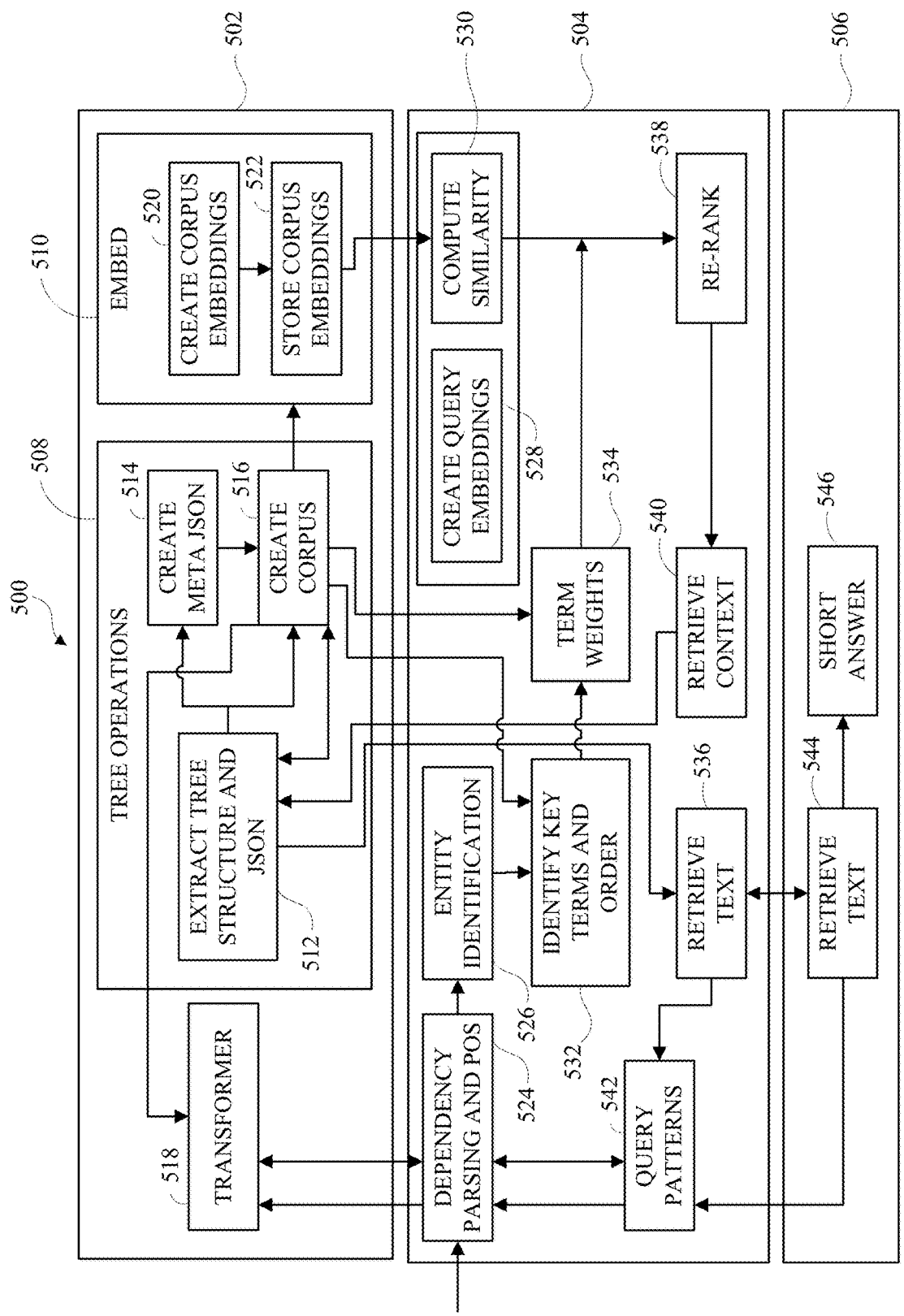
FIG. 5A is a block diagram of an example of a tree bidirectional encoder representations from transformers (TreeBERT) architecture for training the RDT.

FIG. 5A is a block diagram of an example of a TreeBERT architecture of an RDT 500 for the question answering system. The RDT 500 may be the RDT 429 shown in FIG. 4A. As shown in FIG. 5A, the RDT 500 includes three layers: a processing layer 502, a semantic retriever layer 504, and a reader layer 506. The processing layer 502 comprises two sets of tasks: tree operations 508 and create and store corpus embeddings 510. In the processing layer 502, tree-related operations 508 such as extracting structural information 512 and generating tree structure, generating a meta JSON file 514, and creating a corpus 516 by extracting key values from the domain ontology, generating flat files, and creating custom formatted sentences, are performed. These custom formatted sentences are used to train the bidirectional transformer 518 of the RDT 500, which was trained for NLP activities, such as short answer retrieval. Corpus embeddings are created 520 using sentence transformers for all the sentences present in the flat file. A pre-trained model, such as "msmarco-distilbert-base-v2." is used to create the embeddings. The embeddings are stored 522 in an elastic search database, a non-relational database for operations such as comparing them with other embeddings for retrieving similar documents. The operations in the processing layer 502 are performed when (a) the domain-specific documents are ingested into the system initially, (b) new documents are added to the system, and (c) any of the existing documents are modified in the system.

After the operations in the processing layer 502 are performed, the operations/tasks of the semantic retriever layer 504 are performed for all the queries that are posted to the system. The grammatical structure between the words in the query is identified using dependency parser and POS tagging 524. Entities are identified 526 from the query using the custom domain NER model along with dependency parser relations and POS tags. Embeddings are created 528 for the query (referred to as query embeddings) using the same sentence transformer that is used initially to create the corpus embeddings. A semantic comparison of query embeddings and corpus embeddings is performed as a next step. The semantic similarity is computed 530 between the corpus embeddings and query embeddings using cosine similarity to find the closest corpus embeddings. The similarity comparison is required to find the most relevant documents from the corpus for a given query. Key terms and the order of key terms are identified 532 in all the relevant corpus responses and queries using the tree structure. Custom weights are assigned to key terms 534, and the total weighted score is calculated for all relevant responses. Top-k responses are determined based on the question context and are ordered based on the total weighted score/semantic score. The responses are retrieved 536 based on the closeness between the corpus and query embeddings. A cross encoder transformer may be used to find the best match from the top l' documents. The cross encoder transformer is a variant of the transformer model 518 that is used for finding the best answer and improve the responses by re-ranking 538 the retrieved 540 top 'k' responses. The context may be extracted from the query using NLP techniques such as n-gram analysis, parts-of-speech tagging, or pre-trained deep learning models such as recurrent neural networks (RNNs) for analyzing the sequential nature of language, and long short-term memory (LSTM) that can check the long-range dependencies. Rules/query patterns are identified 542 using the order of the key terms, and the transformer model 518 is trained to learn the patterns to improve the response. At Reader 506 level, the most suitable text is retrieved 544 using the transformer model 518 based on the closed responses to determine a short answer 546. This is useful in returning one-word answers typically for questions that contain who, what, where, when, why, how, how many.

FIG. 5B is an illustration of a portion of a sample document 550, and FIG. 5C is an example of an equivalent portion of text 552 from the HTML file that is generated from the portion of the sample document 550 shown in FIG. 5B. Properties such as indentation, paragraph text, font size, and font color is shown in the underlined portion.

FIG. 5D is an illustration of an example of the equivalent Meta JSON file 554 for a portion of the sample document 550 shown in FIG. 5B. FIG. 5D shows important properties such as text, font size, font-weight, indentation, page number, or any combination thereof.

FIG. 5E is an illustration of an example of the equivalent tree structure 556 for the selected paragraphs.

FIG. 5F is an illustration of an example of the flattened tree structure 558 for the selected paragraphs.

Figure 5G:
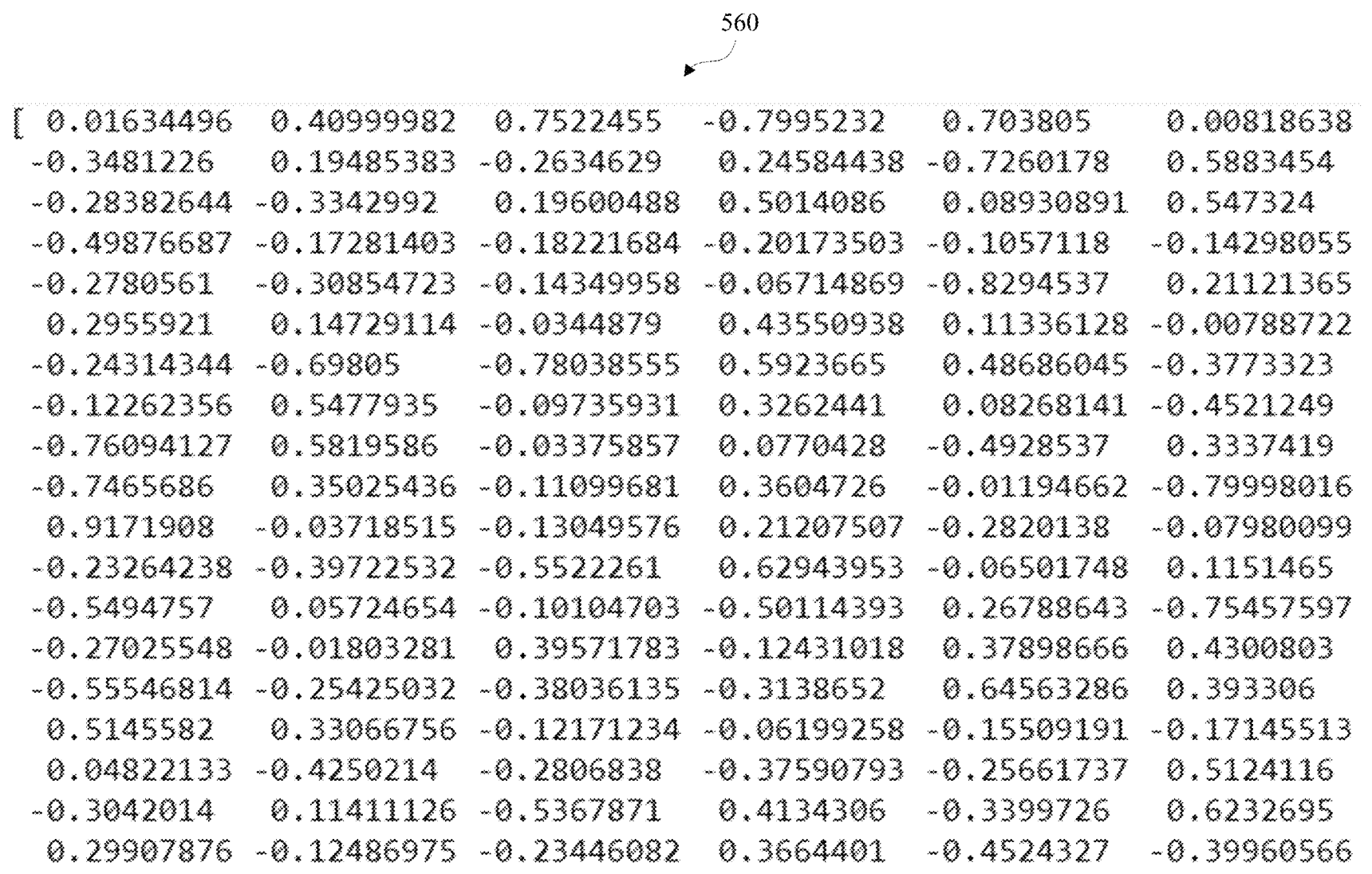

FIG. 5G is an illustration of an example of the equivalent embeddings in vector space 560 for the selected paragraphs using the sentence transformers.

Figure 5H:
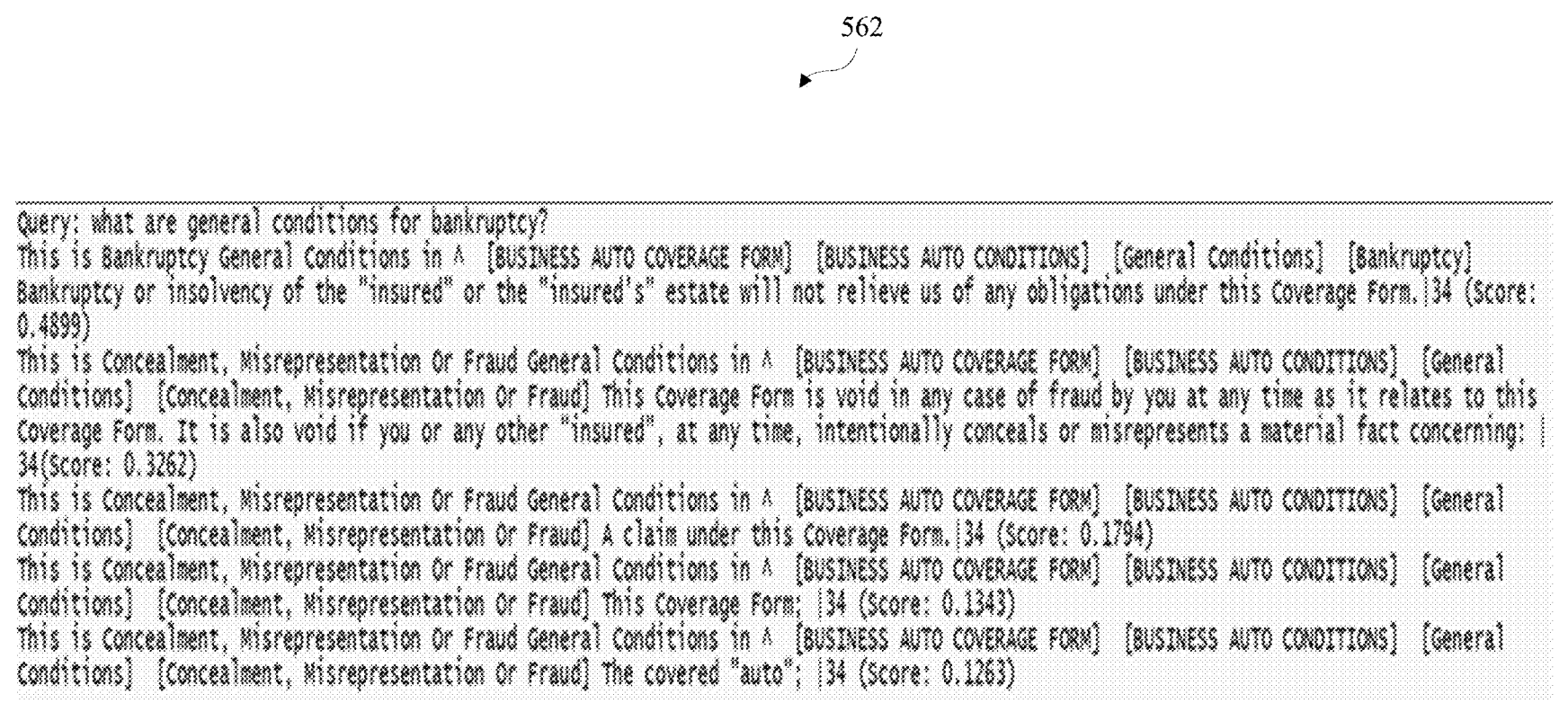

FIG. 5H is an illustration of an example of the equivalent query embeddings in vector space 562 using the sentence transformers and the similarity score for the statements. It can be observed that the paragraphs related to the question have better similarity scores than the rest of the statements.

FIG. 5I is an illustration of an example of the output 564 of the cross encoding. It can be observed that the confidence is increased from 0.48 to 0.97 after cross encoding.

FIG. 5J is an illustration of an example of the output 566 of a relevant paragraph retrieval from the tree structure.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A system comprising:
a memory; and
a processor comprising a reinforcement document transformer configured to:
extract structural information for each corpus document;
generate a tree structure for each corpus document based on extracted structural information of the corpus document;
generate a meta javascript object notation (JSON) file based on each tree structure;
extract a key value from the meta JSON file using a domain ontology;
create one or more corpus embeddings for one or more sentences in a corpus;
store the one or more corpus embeddings in the memory;
perform a semantic comparison of query embeddings and the one or more corpus embeddings;
determine a closest corpus embedding by identifying relevant documents from the corpus for one or more query inputs;
retrieve one or more corpus responses based on the closest corpus embedding using a transformer model; and
identify key terms in the one or more corpus responses and query using the tree structure to identify most appropriate corpus response.

2. The system of claim 1, wherein the reinforcement document transformer is further configured to:
identify an order of the key terms.

3. The system of claim 1, wherein the reinforcement document transformer is further configured to:
compare the key terms with the corpus response; and
determine an extent of a content based on the key terms matching in a level of a hierarchy.

4. The system of claim 1, wherein the processor is configured to use custom formatted sentences to train the reinforcement document transformer.

5. The system of claim 1, wherein the reinforcement document transformer uses a pre-trained model to create the one or more corpus embeddings, wherein sentence transformers are used for each sentence in a flattened tree structure of a corpus document.

6. The system of claim 1, wherein the memory is an elastic search database.

7. The system of claim 1, wherein the reinforcement document transformer is further configured to:
assign custom weights to key terms; and
compute a total weighted score for the one or more corpus responses.

8. The system of claim 1, wherein the one or more corpus response are retrieved based on a closeness value between the corpus and the query embeddings.

9. The system of claim 1, wherein the processor is further configured to:
extracting meta content from each corpus document using a domain ontology;
identify structure characteristics to obtain the tree structure that represents contents of respective corpus documents in a hierarchical structure;
pad the contents in one or more parent positions of the tree structure to obtain a flattened tree structure; and
output the flattened tree structure.

10. The system of claim 9, wherein the flattened tree structure represents enriched content of a corpus document of the respective corpus documents.

11. A system comprising:
a memory; and
a processor comprising a reinforcement document transformer configured to:
create one or more corpus embeddings for one or more sentences in a corpus;
store the one or more corpus embeddings in the memory;
perform a semantic comparison of query embeddings and the one or more corpus embeddings;
determine a closest corpus embedding by identifying relevant documents from the corpus for one or more query inputs;
retrieve one or more corpus responses based on the closest corpus embedding using a transformer model;
assign custom weights to key terms; and
compute a total weighted score for the one or more corpus responses to identify most appropriate corpus response.

12. The system of claim 11, wherein the processor is further configured to:
extract structural information from a corpus document;
generate a tree structure based on the extracted structural information;
generate a meta javascript object notation (JSON) file based on the tree structure; and
extract a key value from the meta JSON file using a domain ontology.

13. The system of claim 11, wherein the reinforcement document transformer is further configured to:
identify an order of the key terms.

14. The system of claim 13, wherein the reinforcement document transformer is further configured to:
compare the key terms with a respective corpus response; and
determine an extent of a content based on the key terms matching in a level of a hierarchy.

15. The system of claim 11, wherein the processor is configured to use custom formatted sentences to train the reinforcement document transformer.

16. The system of claim 11, wherein the reinforcement document transformer uses a pre-trained model to create the one or more corpus embeddings, wherein sentence transformers are used for each sentence in a flattened tree structure of a corpus document.

17. The system of claim 11, wherein the one or more corpus responses are retrieved based on a closeness value between the corpus and the query embeddings.

18. The system of claim 11, wherein the processor is further configured to:
extracting meta content from each corpus document using a domain ontology;

identify structure characteristics to obtain a tree structure that represents contents of respective corpus documents in a hierarchical structure;

pad the contents in one or more parent positions of the tree structure to obtain a flattened tree structure; and output the flattened tree structure.

19. The system of claim 18, wherein the flattened tree structure represents enriched content of a corpus document of the respective corpus documents.

20. A system comprising:

a memory; and a processor comprising a reinforcement document transformer configured to:

generate a tree structure for each corpus document based on extracted structural information of the corpus document;

create one or more corpus embeddings for one or more sentences in a corpus;

store the one or more corpus embeddings in the memory;

perform a semantic comparison of query embeddings and the one or more corpus embeddings;

determine a closest corpus embedding by identifying relevant documents from the corpus for one or more query inputs;

retrieve one or more corpus responses based on the closest corpus embedding using a transformer model;

identify key terms in the one or more corpus responses and query using the tree structure to identify most appropriate corpus response;

compare the key terms with the corpus response; and determine an extent of a content based on the key terms matching in a level of a hierarchy.

\* \* \* \* \*